(12) United States Patent
Wu et al.

(10) Patent No.: US 11,863,494 B2
(45) Date of Patent: Jan. 2, 2024

(54) USER EQUIPMENT OVERRIDE FOR ENHANCED TYPE-II CHANNEL STATE INFORMATION

(71) Applicant: QUALCOMM Incorporated, San Diego, CA (US)

(72) Inventors: Liangming Wu, Beijing (CN); Chenxi Hao, Beijing (CN); Yu Zhang, Beijing (CN); Min Huang, Beijing (CN); Qiaoyu Li, Beijing (CN); Parisa Cheraghi, Cambridge (GB); Lei Xiao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 17/309,994

(22) PCT Filed: Jan. 14, 2020

(86) PCT No.: PCT/CN2020/071909
§ 371 (c)(1),
(2) Date: Jul. 8, 2021

(87) PCT Pub. No.: WO2020/147701
PCT Pub. Date: Jul. 23, 2020

(65) Prior Publication Data
US 2022/0094504 A1 Mar. 24, 2022

(30) Foreign Application Priority Data
Jan. 16, 2019 (WO) ................ PCT/CN2019/071862

(51) Int. Cl.
*H04L 5/00* (2006.01)
*H04W 72/02* (2009.01)
*H04W 72/0453* (2023.01)

(52) U.S. Cl.
CPC ........... *H04L 5/0057* (2013.01); *H04W 72/02* (2013.01); *H04W 72/0453* (2013.01)

(58) Field of Classification Search
CPC ..... H04W 24/10; H04L 1/0026; H04B 7/0626
See application file for complete search history.

(56) References Cited

U.S. PATENT DOCUMENTS

| 10,904,783 B2 | 1/2021 | Chen et al. |
| 2014/0092787 A1* | 4/2014 | Han ..................... H04W 40/246 370/280 |
| 2018/0145737 A1 | 5/2018 | Rahman et al. |

FOREIGN PATENT DOCUMENTS

| CN | 101807981 A | 8/2010 |
| CN | 108039903 A | 5/2018 |

(Continued)

OTHER PUBLICATIONS

Ericsson: "On CSI Reporting", 3GPP TSG-RAN WG1 NR Ad Hoc #3, R1-1716349, Nagoya, Japan, Sep. 18-21, 2017, 11 Pages.

(Continued)

*Primary Examiner* — Kevin Kim
(74) *Attorney, Agent, or Firm* — QUALCOMM Incorporated (57) ABSTRACT

Various aspects of the present disclosure generally relate to wireless communication. In some aspects, a user equipment may determine that an enhanced type-II channel state information (CSI) report configuration, associated with transmitting CSI feedback to a base station, is to be overridden; and transmit, based at least in part on determining that the enhanced type-II CSI report configuration is to be overridden, a CSI report using another CSI report configuration, wherein the CSI report includes the CSI feedback and an indication that the enhanced type-II CSI report configuration has been overridden. Numerous other aspects are provided.

30 Claims, 6 Drawing Sheets

(56) References Cited

FOREIGN PATENT DOCUMENTS

| CN | 109155693 A | 1/2019 |
|----|----|----|
| WO | 2014052084 A1 | 4/2014 |
| WO | WO-2016115491 A1 | 7/2016 |
| WO | WO-2017078601 A1 | 5/2017 |
| WO | 2018097600 A1 | 5/2018 |
| WO | 2018097680 A1 | 5/2018 |
| WO | 2018202134 A1 | 11/2018 |
| WO | 2018229078 A1 | 12/2018 |

OTHER PUBLICATIONS

Supplementary European Search Report—EP20741321—Search Authority—Munich—dated Oct. 4, 2022.
International Search Report and Written Opinion—PCT/CN2019/071862—ISA/EPO—dated Oct. 9, 2019.
International Search Report and Written Opinion—PCT/CN2020/071909—ISA/EPO—dated Apr. 13, 2020.
ZTE: "CSI Enhancement for MU-MIMO Support," R1-1813913, 3GPP TSG RAN WG1 Meeting #95, Spokane, USA, Nov. 12-16, 2018, 11 pages, the whole document.
ZTE: "Type II CSI Enhancements for MU-MIMO," R1-1810219, 3GPP TSG RAN WG1 Meeting #94bis, Oct. 12, 2018 (Oct. 12, 2018), 8 pages, the whole document.

\* cited by examiner

USER EQUIPMENT OVERRIDE FOR ENHANCED TYPE-II CHANNEL STATE INFORMATION

CROSS-REFERENCE TO RELATED APPLICATIONS

This application is a 371 national stage of PCT Application No. PCT/CN2020/071909 filed on Jan. 14, 2020, entitled "USER EQUIPMENT OVERRIDE FOR ENHANCED TYPE-II CHANNEL STATE INFORMATION," which claims priority to Patent Cooperation Treaty (PCT) Application No. PCT/CN2019/071862, filed on Jan. 16, 2019, entitled "USER EQUIPMENT OVERRIDE FOR ENHANCED TYPE-II CHANNEL STATE INFORMATION," which are hereby expressly incorporated by reference herein.

FIELD OF THE DISCLOSURE

Aspects of the present disclosure generally relate to wireless communication, and more particularly to techniques and apparatuses for user equipment (UE) override or improvement for enhanced type-II channel state information (CSI).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that an enhanced type-II channel state information (CSI) report configuration, associated with transmitting CSI feedback to a base station, is to be overridden; and transmitting, based at least in part on determining that the enhanced type-II CSI report configuration is to be overridden, a CSI report using another CSI report configuration, wherein the CSI report includes the CSI feedback and an indication that the enhanced type-II CSI report configuration has been overridden.

In some aspects, a UE for wireless communication may include memory and one or more processors operatively coupled to the memory. The memory and the one or more processors may be configured to determine that an enhanced type-II CSI report configuration, associated with transmitting CSI feedback to a base station, is to be overridden; and transmit, based at least in part on determining that the enhanced type-II CSI report configuration is to be overridden, a CSI report using another CSI report configuration, wherein the CSI report includes the CSI feedback and an indication that the enhanced type-II CSI report configuration has been overridden.

In some aspects, a non-transitory computer-readable medium may store one or more instructions for wireless communication. The one or more instructions, when executed by one or more processors of a UE, may cause the one or more processors to determine that an enhanced type-II CSI report configuration, associated with transmitting CSI feedback to a base station, is to be overridden; and transmit, based at least in part on determining that the enhanced type-II CSI report configuration is to be overridden, a CSI report using another CSI report configuration, wherein the CSI report includes the CSI feedback and an indication that the enhanced type-II CSI report configuration has been overridden.

In some aspects, an apparatus for wireless communication may include means for determining that an enhanced type-II CSI report configuration, associated with transmitting CSI feedback to a base station, is to be overridden; and means for transmitting, based at least in part on determining that the enhanced type-II CSI report configuration is to be overridden, a CSI report using another CSI report configuration, wherein the CSI report includes the CSI feedback and an indication that the enhanced type-II CSI report configuration has been overridden.

In some aspects, a method of wireless communication, performed by a UE, may include determining that an identity matrix is to be used as a frequency domain basis for an enhanced type-II CSI report configuration associated with transmitting CSI feedback to a base station; and transmitting a CSI report using the identity matrix as the frequency domain basis for the enhanced type-II CSI report configuration.

In some aspects, a UE for wireless communication may include memory and one or more processors operatively coupled to the memory. The memory and the one or more processors may be configured to determine that an identity matrix is to be used as a frequency domain basis for an enhanced type-II CSI report configuration associated with transmitting CSI feedback to a base station; and transmit a CSI report using the identity matrix as the frequency domain basis for the enhanced type-II CSI report configuration.

In some aspects, a non-transitory computer-readable medium may store one or more instructions for wireless communication. The one or more instructions, when executed by one or more processors of a UE, may cause the one or more processors to determine that an identity matrix is to be used as a frequency domain basis for an enhanced type-II CSI report configuration associated with transmitting CSI feedback to a base station; and transmit a CSI report using the identity matrix as the frequency domain basis for the enhanced type-II CSI report configuration.

In some aspects, an apparatus for wireless communication may include means for determining that an identity matrix is to be used as a frequency domain basis for an enhanced type-II CSI report configuration associated with transmitting CSI feedback to a base station; and means for transmitting a CSI report using the identity matrix as the frequency domain basis for the enhanced type-II CSI report configuration.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
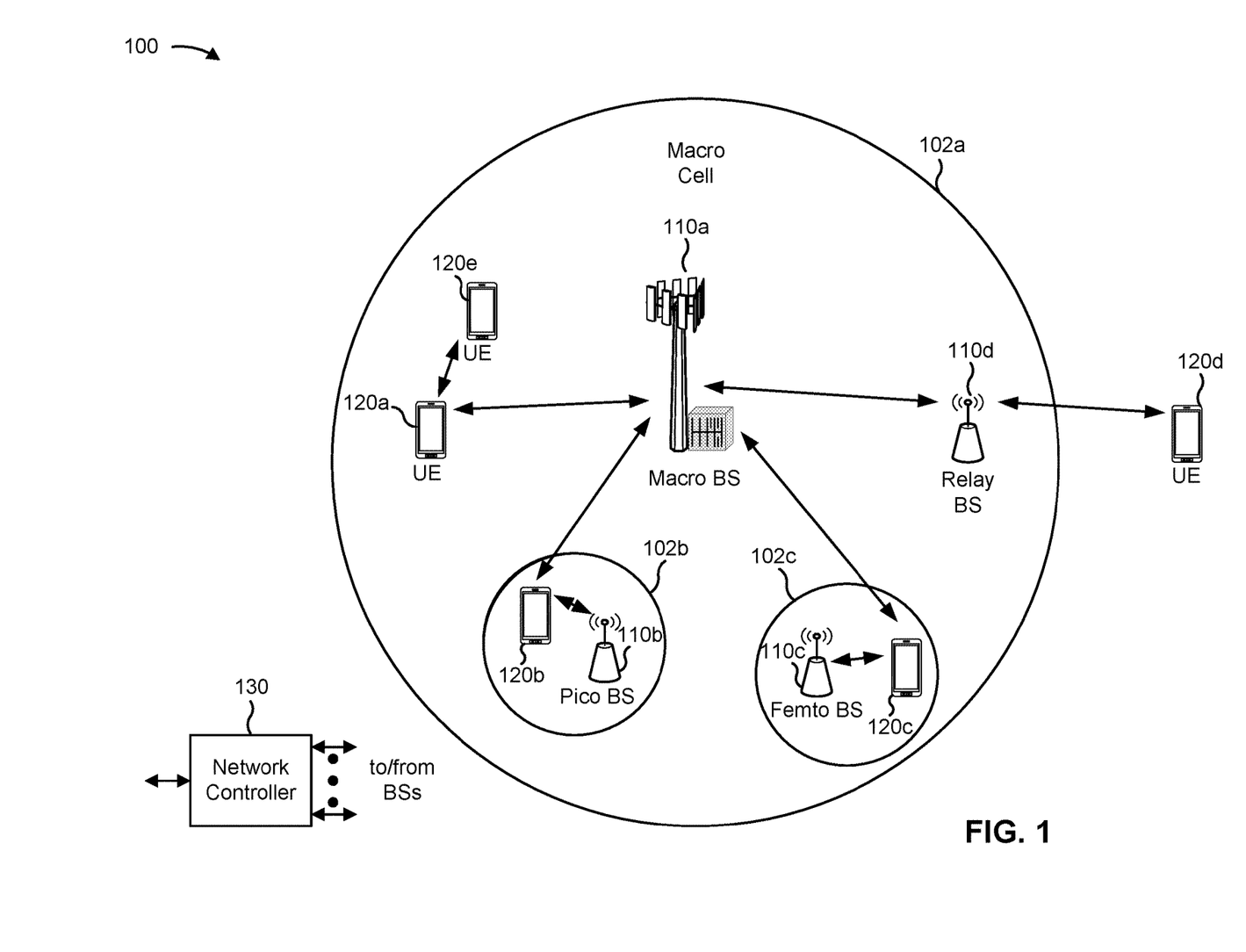
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
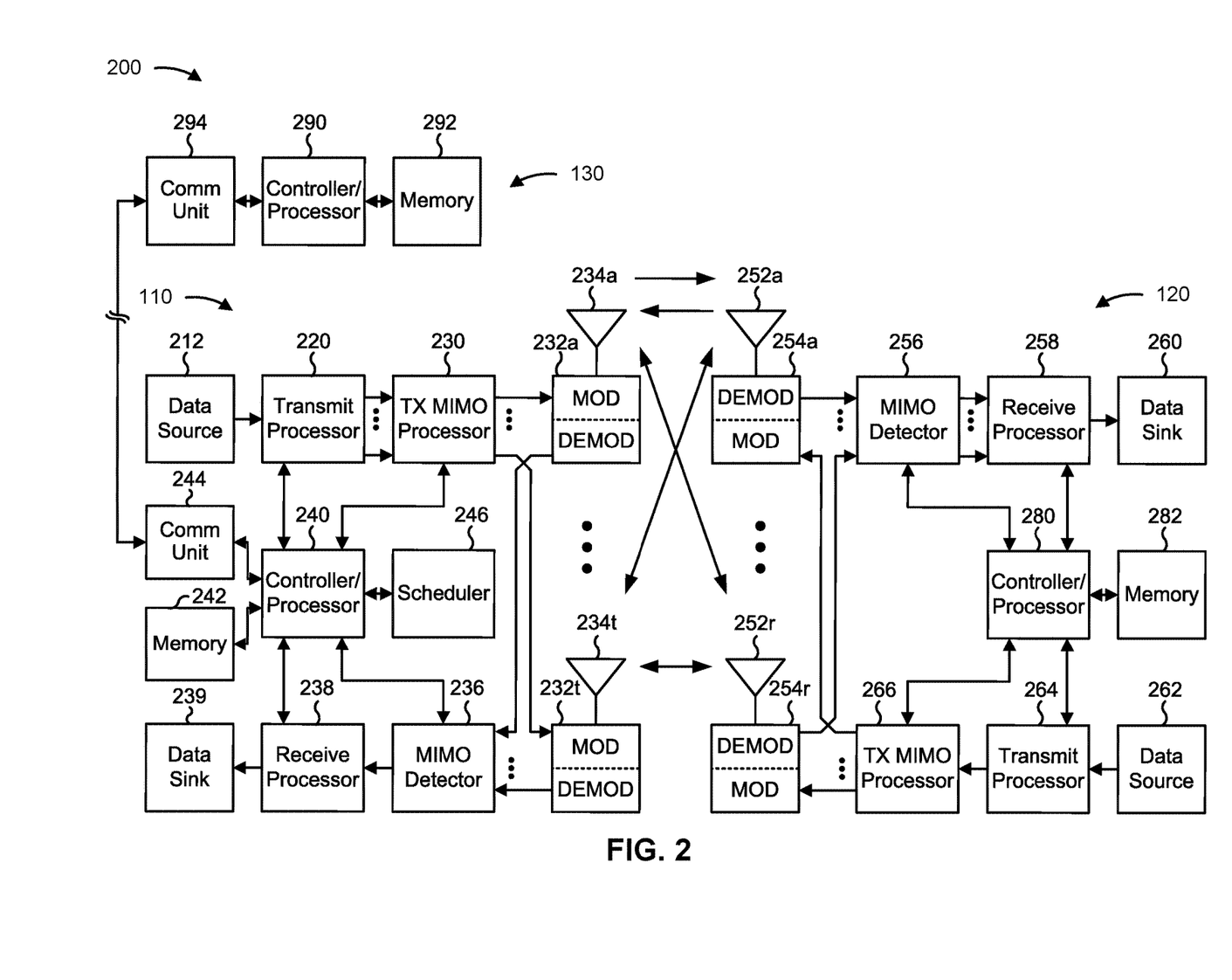
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UE override and/or improvement for enhanced type-II CSI, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 600 of FIG. 6, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining that an enhanced type-II CSI report configuration, associated with transmitting CSI feedback to a base station, is to be overridden; means for transmitting, based at least in part on determining that the enhanced type-II CSI report configuration is to be overridden, a CSI report using another CSI report configuration, wherein the CSI report includes the CSI feedback and an indication that the enhanced type-II CSI report configuration has been overridden; and/or the like. In some aspects, such means may include one or more components of UE 120 described in connection with FIG. 2.

In some aspects, UE 120 may include means for determining that an identity matrix is to be used as a frequency domain basis for an enhanced type-II CSI report configuration associated with transmitting CSI feedback to a base station; means for transmitting a CSI report using the identity matrix as the frequency domain basis for the enhanced type-II CSI report configuration; and/or the like. In some aspects, such means may include one or more components of UE 120 described in connection with FIG. 2.

As indicated above, FIG. 2 is provided merely as an example. Other examples may differ from what is described with regard to FIG. 2.

A BS (e.g., BS 110) may transmit many beams to a UE (e.g., UE 120). For example, the BS may generate the beams using an antenna panel that generates beams at a spatial and/or phase displacement from each other. The BS and the UE may select a set of beams that are to be used for communication between the BS and the UE. For example, the set of beams transmitted from the BS to the UE may be referred to herein as a communication link, a downlink, and/or the like. The communication link between the BS and the UE may propagate in a medium and/or through various geometric paths, which are collectively referred to herein as a channel between the BS and the UE.

In some aspects, the UE may select a set of beams for communication with the BS. For example, the UE may select the set of beams based at least in part on the set of beams being associated with favorable characteristics (e.g., a satisfactory receive power, a satisfactory signal to interference plus noise (SINR) value, etc.). The UE may generate a codeword that indicates the set of beams and parameters to be used for using a codebook based at least in part on performing channel estimation of the channel between the BS and the UE.

One such codebook is the type-II codebook, prescribed in 5G/NR. The type-II codebook may use a two-stage procedure to generate the codeword: a first stage wherein the set of beams is selected for a wideband of the communication link (e.g., sometimes referred to herein as W1), and a second stage wherein linear combination is performed, for a set of subbands, using the set of beams for each set of subbands. The codeword may be based at least in part on the linear combination, and may indicate the set of beams and/or respective amplitudes, phase coefficients, and/or the like. Thus, the UE may provide an indication of channel state at the UE and may request the set of beams to be used for the UE. The type-II codebook may provide more precise specification of the channel state than a type-I codebook, which may provide a predefined codeword-based approach to specifying selected beams. Thus, the type-II codebook may be referred to as a high resolution codebook in comparison to the type-I codebook. The type-II codebook may improve multi-user multiple input multiple output (MU-MIMO) performance on the communication link.

For one type of type-II codebook (e.g., the codebook specified in Release 15 of the 3GPP standard for 5G/NR), the precoder of the codebook is based at least in part on a linear combination of discrete Fourier transform (DFT) beams. The linear combination may define the precoder W as $W = W_1 W_2$, wherein the spatial domain compression matrix $$W_1 = \begin{bmatrix} v_0 v_1 \ldots v_{L-1} & 0 \\ 0 & v_0 v_1 \ldots v_{L-1} \end{bmatrix},$$

wherein $\{v_i\}_{i=0}^{L-1}$ are L spatial domain basis vectors of dimension $N_1 N_2 \times 1$ (mapped to the two polarizations, so 2L in total), $P = 2N_1 N_2$ indicates a number of dimensions (sometimes represented as D), and the combination coefficient matrix $W_2$ is composed of $K = 2Lv$ linear combination coefficients, where $v$ indicates a total number of layers. Each column in $W_2$ indicates the linear combination of complex coefficients (i.e., amplitude and phase) for one layer, wherein the amplitude coefficient is given by $\{p_i^{(1)} p_i^{(2)}\}_{i=0}^{2L-1}$ for $l=0, \ldots, v-1$, and $p_i^{(1)}$ and $p_i^{(2)}$ are the wideband and subband coefficients, respectively. The phase coefficient is given by $\{c_{l,i}\}_{i=0}^{2L-1}$ for $l=0, \ldots, v-1$, and $c_i$ is one of the 8 phase shift keying (8PSK) or the quadrature phase shift keying (QPSK) constellation points.

The UE may report the above values and/or other values associated with channel estimation using channel state information (CSI) feedback. CSI feedback for the type-II codebook may include two parts: a first part, sometimes referred to as CSI part I, and a second part, sometimes referred to as CSI part II. In some cases, the first part may have a smaller payload than the second part, and/or may have a fixed payload. For example, the first part may have a payload size of less than approximately 50 bits, whereas the second part may have a variable payload size that may be dependent on the first part. In some cases, the second part may have a payload size of approximately 100 bits to 600 bits, although other values may be used.

In some cases, the first part may identify one or more of: a rank indicator (RI) (e.g., 1 bit to indicate one layer $v=1$ or two layers $v=2$ when the configured maximum rank is 2); wideband and subband differential channel quality indicators (CQI), for which a total payload size may be dependent on the number of subbands (e.g., approximately $4+18 \times 2=40$ bits for 19 subbands); an indication of the number of non-zero wideband amplitude coefficients $Q_l$ for each layer; and/or the like. In some cases, the second part may identify one or more of: wideband and/or subband precoding matrix indicators (PMIs) including a spatial basis vector selection indication; wideband and subband amplitude coefficients; subband phase coefficients; and/or the like.

In some cases, the type-II CSI feedback may use a compressed type-II precoder. This may reduce overhead of type-II CSI feedback. The compressed precoder may exploit the sparsity of the spatial domain and/or the frequency domain. For example, an example of a compressed type-II precoder W is given by $W = W_1 \tilde{W}_2 W_f^H$, wherein the precoder matrix W has $P = 2N_1 N_2$ rows (representing the spatial domain and the number of ports) and $N_3$ columns (wherein $N_3$ is a frequency-domain compression unit of resource blocks or reporting subbands). The $W_1$ matrix, described above, is the spatial basis consisting of L beams per polarization group (hence a total of 2L beams). The $\tilde{W}_2$ matrix indicates all of the required linear combination complex coefficients (amplitude and co-phasing), similarly to what is described above. The $W_f$ matrix is composed of the basis vectors used to perform compression in frequency domain, $W_f = [f_0 f_1 \ldots f_{M-1}]$, where $\{f_m\}_{m=0}^{M-1}$ are M size-$N_3 \times 1$ orthogonal DFT vectors for each spatial basis $i=0, \ldots, 2L-1$. The above type-II CSI feedback may be referred to in some cases as enhanced or modified type-II CSI feedback (e.g., enhanced relative to an approach that does not use basis vectors in the spatial and frequency domains to compress feedback size).

The CSI feedback for this enhanced type-II CSI feedback may include a spatial domain basis vector selection that is similar to the approach described in connection with the type-II CSI feedback configuration. The CSI feedback may further include a frequency-domain (FD) basis subset selection (wherein M out of a total $N_3$ basis vectors are selected). In some cases, common FD basis vectors for all the 2L spatial beams may be used, which is referred to herein as Alternative 1. In these cases, M basis vectors are dynamically selected and reported. The value of M may be configured by the network or reported by the UE. In other cases, referred to herein as Alternative 2, independent FD basis vectors may be used for each spatial domain basis vector, with potentially different numbers and/or selections of FD basis vectors for each spatial domain basis vector. The total number of FD basis vectors across all the 2L spatial beams may be configured.

The enhanced type-II CSI feedback may further include the FD coefficients (e.g., amplitude and phase) in $\tilde{W}_2$. For Alternative 1 (the common FD basis vector subset selection), the enhanced type-II CSI feedback may report only a subset $K_0 < K = 2LM$ of the coefficients. For Alternative 2 (the independent basis subset selection), the enhanced type-II CSI feedback may report $K = \sum_{i=0}^{2L-1} M_i$ amplitude and phase coefficients, wherein $M_i$ is the number of FD basis vectors associated with one spatial beam.

A variety of quantization and reporting options may be used, two examples of which are provided below. As a first example, for each of the K or $K_0$ FD coefficients, the enhanced type-II CSI feedback may use 3-bit amplitude and QPSK or 8PSK phase. As a second example, the enhanced type-II CSI feedback may report a 3-bit wideband amplitude for each beam or spatial domain basis vector, a 2-bit or 3-bit differential amplitude for each FD coefficient, and a QPSK or 8PSK phase bit.

However, in some cases, it may be desirable for the UE to override and/or alter a configuration that would otherwise cause the UE to transmit CSI feedback using the conventional enhanced type-II CSI report configuration described above. For example, if a configured number of FD basis vectors and/or a number of coefficients is insufficient, reconstruction performance may be degraded if the actual channel delay spread is significant. As a particular example, if a precoder comprises a large delay spread, a power of the precoder may not be well captured by the configured number of FD basis vectors and/or the number of coefficients. Thus, in some cases, it may be desirable for the UE to override the CSI report such that the UE uses a CSI report configuration other than the conventional enhanced type-II CSI report configuration. Similarly, in some cases, it may be desirable for the UE to use an improved type-II CSI report configuration rather than the conventional enhanced type-II CSI report configuration.

Some techniques and apparatuses described herein provide UE override for enhanced type-II CSI. In some aspects, the UE may determine that an enhanced type-II CSI report configuration, associated with transmitting CSI feedback to a base station, is to be overridden, and may transmit a CSI report using another CSI report configuration. In some aspects, in such a case, the CSI report may include the CSI feedback and an indication that the enhanced type-II CSI report configuration has been overridden. Additionally, some techniques and apparatuses described herein provide an improved enhanced type-II CSI report configuration. In some aspects, the UE may determine that an identity matrix is to be used as a frequency domain basis for an enhanced type-II CSI report configuration associated with transmitting CSI feedback to a base station (e.g., rather than using a DFT matrix as the frequency basis), and may transmit a CSI report using the identity matrix as the frequency domain basis. In the case of either the override of the enhanced type-II CSI report configuration or use of the improved enhanced type-II CSI report configuration, communication performance between the UE and the BS is improved based at least in part on improved accuracy in reporting of CSI feedback.

Figure 3:
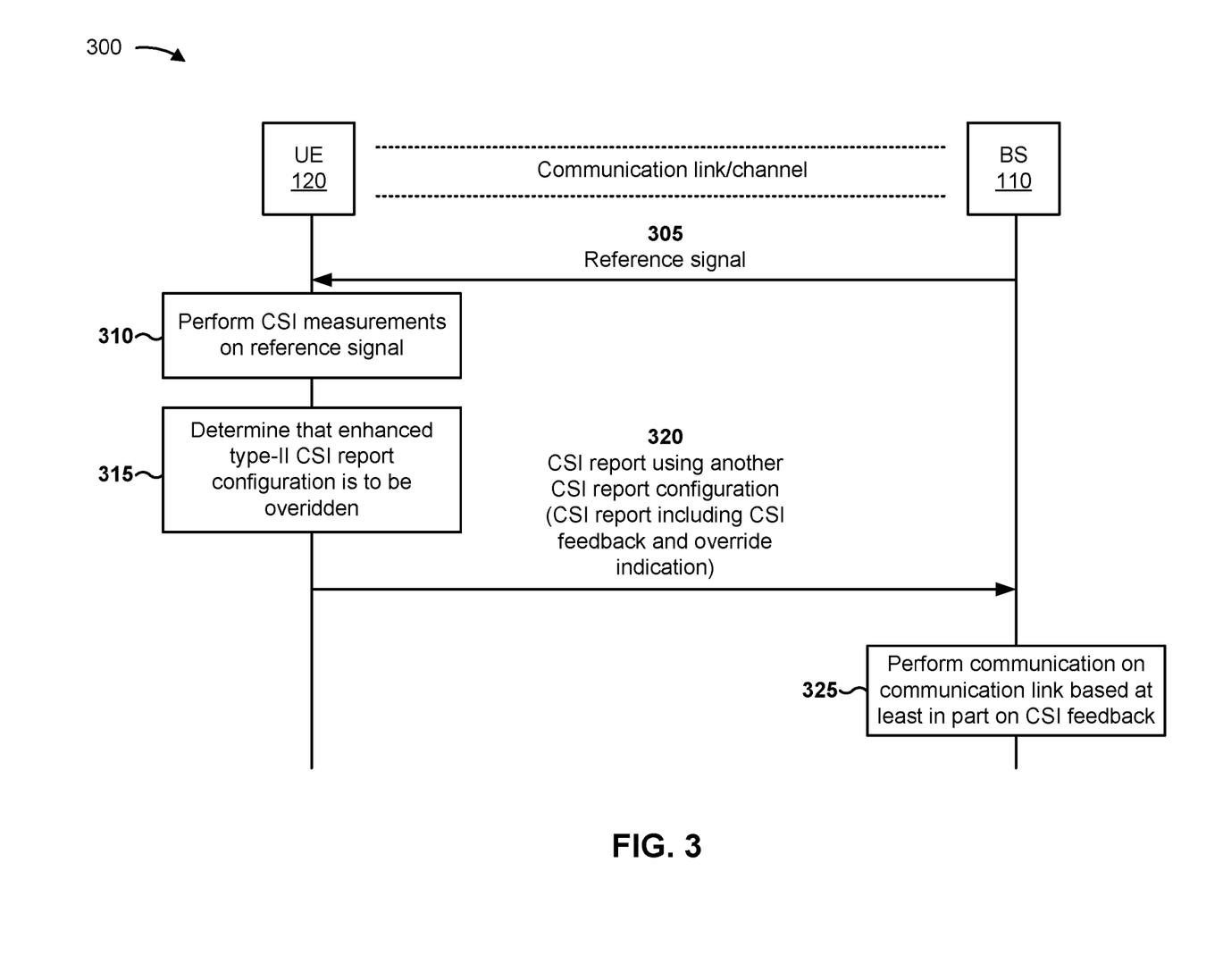
FIG. 3 is a diagram illustrating an example of user equipment override for enhanced type-II channel state information, in accordance with various aspects of the present disclosure.

FIG. 3 is a diagram illustrating an example 300 of UE override for enhanced type-II CSI, in accordance with various aspects of the present disclosure. As shown, example 300 includes a UE 120 and a BS 110 that are associated with a communication link. As further shown, the communication link may be associated with a channel. For example, the communication link may be referred to as the channel, or may propagate via the channel.

As shown in FIG. 3, and by reference number 305, BS 110 may transmit a reference signal transmission to UE 120. The reference signal transmission may include, for example, a CSI reference signal, a demodulation reference signal, and/or the like. As shown by reference number 310, UE 120 may perform CSI measurements on the reference signal transmission. For example, UE 120 may perform channel estimation or another operation based at least in part on the reference signal transmissions in order to determine CSI feedback.

As shown by reference number 315, UE 120 may determine that an enhanced type-II CSI report configuration, associated with transmitting the CSI feedback to BS 110, is to be overridden. For example, UE 120 may be configured with a codebook indicating that UE 120 is to use the enhanced type-II CSI report configuration in association with transmitting a CSI report to BS 110. However, in some aspects, as indicated by reference number 315, UE 120 may determine that UE 120 is to override the enhanced type-II CSI report configuration.

In some aspects, UE 120 may determine that the enhanced type-II CSI report configuration is to be overridden based at least in part on determining that a metric, associated with the enhanced type-II CSI report configuration, is inferior to a metric associated with a type-I CSI report configuration. For example, UE 120 may be configured with the type-I CSI report configuration. Here, based at least in part on the CSI measurements performed by UE 120, UE 120 may compute a metric for the enhanced type-II CSI report configuration and a comparable metric for the type-I CSI report configuration. In this example, if the metric associated with the enhanced type-II CSI report configuration is inferior to (e.g., less than by a threshold amount) the metric associated with the type-I CSI report configuration, then UE 120 may determine that UE 120 is to override the enhanced type-II CSI report configuration. In some aspects, the metric used by UE 120 to make this determination may include a signal to noise ratio (SNR), a capacity metric, a channel quality indicator (CQI), and/or the like.

In some aspects, UE 120 may determine that the enhanced type-II CSI report configuration is to be overridden based at least in part on determining that a difference between a metric, associated with the enhanced type-II CSI report configuration, and a metric associated with a type-II CSI report configuration satisfies a threshold. For example, UE 120 may be configured with the type-II CSI report configuration. Here, based at least in part on the CSI measurements performed by UE 120, UE 120 may compute a metric for the enhanced type-II CSI report configuration and a comparable metric for the type-II CSI report configuration. In this example, if a difference between the metric associated with the enhanced type-II CSI report configuration and the metric associated with the type-II CSI report configuration, then UE 120 may determine that UE 120 is to override the enhanced type-II CSI report configuration. In some aspects, the metric used by UE 120 to make this determination may include, for example, an SNR, a capacity metric, a CQI, and/or the like. In some aspects, the threshold may be predefined on UE 120 (e.g., in accordance with an applicable 3GPP Standard), or may be configured on UE 120 (e.g., by BS 110).

In some aspects, UE 120 may determine that the enhanced type-II CSI report configuration is to be overridden based at least in part on a condition configured on or determined by UE 120. The condition may include, for example, a determination by UE 120 that a configured parameter (e.g., a configured number of FD basis vectors, a configured number of coefficients, and/or the like) fails to satisfy a threshold (e.g., is less than a particular number) and/or is otherwise determined to be insufficient to a particular degree.

As shown by reference number 320, UE 120 may transmit, based at least in part on determining that the enhanced type-II CSI report configuration is to be overridden, a CSI report using another CSI report configuration. As shown, the CSI report may include the CSI feedback and an indication that the enhanced type-II CSI report configuration has been overridden.

In some aspects, UE 120 may include the indication that the enhanced type-II CSI report configuration has been overridden by including a particular combination of values (e.g., one or more unused and/or invalid values) in the CSI report. For example, UE 120 may include the indication in the CSI report by including, in the CSI report, a particular combination of one or more unused and/or invalid rank indicators (RI), one or more unused and/or invalid precoding matrix indicators (PMI), one or more unused and/or invalid channel quality indicators (CQI), and/or the like. In such a case, the use of the particular combination may indicate, to BS 110, that the enhanced type-II CSI report configuration has been overridden.

As an example, in some aspects, UE 120 may include the indication that the enhanced type-II CSI report configuration has been overridden in the CSI report by using an out of range (OOR) CQI included the CSI report. In such a case, the use of the OOR CQI may indicate, to BS 110, that the enhanced type-II CSI report configuration has been overridden.

As another example, in some aspects, UE 120 may include the indication that the enhanced type-II CSI report configuration has been overridden in the CSI report by using a dedicated PMI included in the CSI report. For example, the dedicated PMI may identify a number of FD basis vectors as zero, a number of coefficients as zero, amplitudes of all coefficients as zero, and/or the like. In such a case, the use of the dedicated PMI may indicate, to BS 110, that the enhanced type-II CSI report configuration has been overridden.

As another example, in some aspects, UE 120 may include the indication that the enhanced type-II CSI report configuration has been overridden using an indication that an identity matrix has been selected as a frequency domain basis (e.g., (e.g., by including a dedicated basis selection indication that indicates that an identity matrix was selected as the frequency domain basis). In such a case, the other CSI report configuration used by UE 120 is an enhanced type-II CSI report configuration using the identity matrix as the frequency domain basis. In some aspects, the use of the identity matrix results in per subband level reporting in the CSI report. Additional detail regarding selection and use of the identity matrix as the frequency domain basis are provided below with regard to FIGS. 5 and 6.

In some aspects, UE 120 may include the indication that the enhanced type-II CSI report configuration has been overridden by including an addition in the CSI report (e.g., an additional item of information that would otherwise not be included in the CSI report). In some aspects, the addition may include, for example, one or more bits added to the CSI report. In such a case, the addition to the CSI report may indicate, to BS 110, that the enhanced type-II CSI report configuration has been overridden.

In some aspects, UE 120 may include the indication that the enhanced type-II CSI report configuration has been overridden in part 1 of the CSI report and/or in part 2 of the CSI report.

In some aspects, the enhanced type-II CSI report configuration may be associated with a different codebook than that of the other CSI report configuration (i.e., the CSI report configuration with which UE 120 overrides the enhanced type-II CSI report configuration). For example, the enhanced type-II CSI report configuration may be associated with a first codebook configured on UE 120, and the other CSI report configuration may be associated with a second codebook configured on UE 120. In such a case, in some aspects, the other CSI report configuration may be a type-II CSI report configuration that is associated with the second codebook. For example, when the first codebook comprises Release 16 Type-II CSI reporting, the other report configuration may be associated with a codebook that comprises Release 15 Type-II CSI reporting. As another example, when the first codebook comprises Release 17 Type-II CSI reporting, the other report configuration may be associated with a codebook that comprises Release 16 Type-II CSI reporting.

Alternatively, the other CSI report configuration may be a type-I CSI report configuration that is associated with the second codebook.

In some aspects, the other CSI report configuration is a simplified enhanced type-II CSI report configuration. In other words, UE 120 may be configured with a simplified enhanced type-II CSI report configuration (e.g., a configuration that uses fewer and/or simpler parameters, matrices, and/or the like), and may override the enhanced type-II CSI report configuration using the simplified enhanced type-II CSI report configuration.

In some aspects, the other CSI report configuration is a modified enhanced type-II CSI report configuration. In other words, UE 120 may be configured with a modified enhanced type-II CSI report configuration (e.g., a configuration that uses different and/or alternate parameters, matrices, and/or the like), and may override the enhanced type-II CSI report configuration using the modified enhanced type-II CSI report configuration.

In some aspects, when using the other CSI report configuration in association with transmitting the CSI report, UE 120 may override one or more parameters of the other CSI report configuration. For example, UE 120 may override a quantization level, a spatial domain basis vector, a subband size, and/or another parameter of the other CSI report configuration when transmitting the CSI report.

In some aspects, based at least in part on the other CSI report configuration, UE 120 may include information associated with a single coefficient and/or information associated with a single basis in the CSI report. For example, the other CSI report configuration may indicate that information associated with a single coefficient and/or information associated with a single basis is to be included in the CSI report, and UE 120 may transmit the CSI report according to the other CSI report configuration. In some aspects, the information associated with the single coefficient may include information that identifies the single coefficient or information that identifies a location of a strongest coefficient (e.g., such that the CSI report includes information associated with the single coefficient and/or the single basis).

In some aspects, based at least in part on the other CSI report configuration, UE 120 may include only a spatial domain compression matrix (W1) in the CSI report. For example, the other CSI report configuration may indicate that only a spatial domain compression matrix is to be included in the CSI report, and UE 120 may transmit the CSI report according to the other CSI report configuration (e.g., such that the CSI report includes only W1).

In some aspects, based at least in part on the other CSI report configuration, UE 120 may not include CSI part II in the CSI report. For example, the other CSI report configuration may indicate that CSI part II is not to be included in the CSI report, and UE 120 may transmit the CSI report according to the other CSI report configuration (e.g., such that the CSI report does not include part II).

As shown by reference number 325, BS 110 (and/or UE 120) may perform communication on the communication link based at least in part on the CSI feedback included in the CSI report. For example, BS 110 may receive the CSI report, and may generate one or more beamformed beams for UE 120 using phase and amplitude FD coefficients, one or more spatial domain basis vectors, one or more frequency domain basis vectors, and/or other information included in the CSI feedback.

In this way, UE 120 may override enhanced type-II CSI in order to improve accuracy in reporting of CSI feedback (e.g., in a case when the conventional enhanced type-II CSI report configuration is insufficient), thereby improving communication performance between UE 120 and BS 110.

As indicated above, FIG. 3 is provided as an example. Other examples may differ from what is described with respect to FIG. 3.

Figure 4:
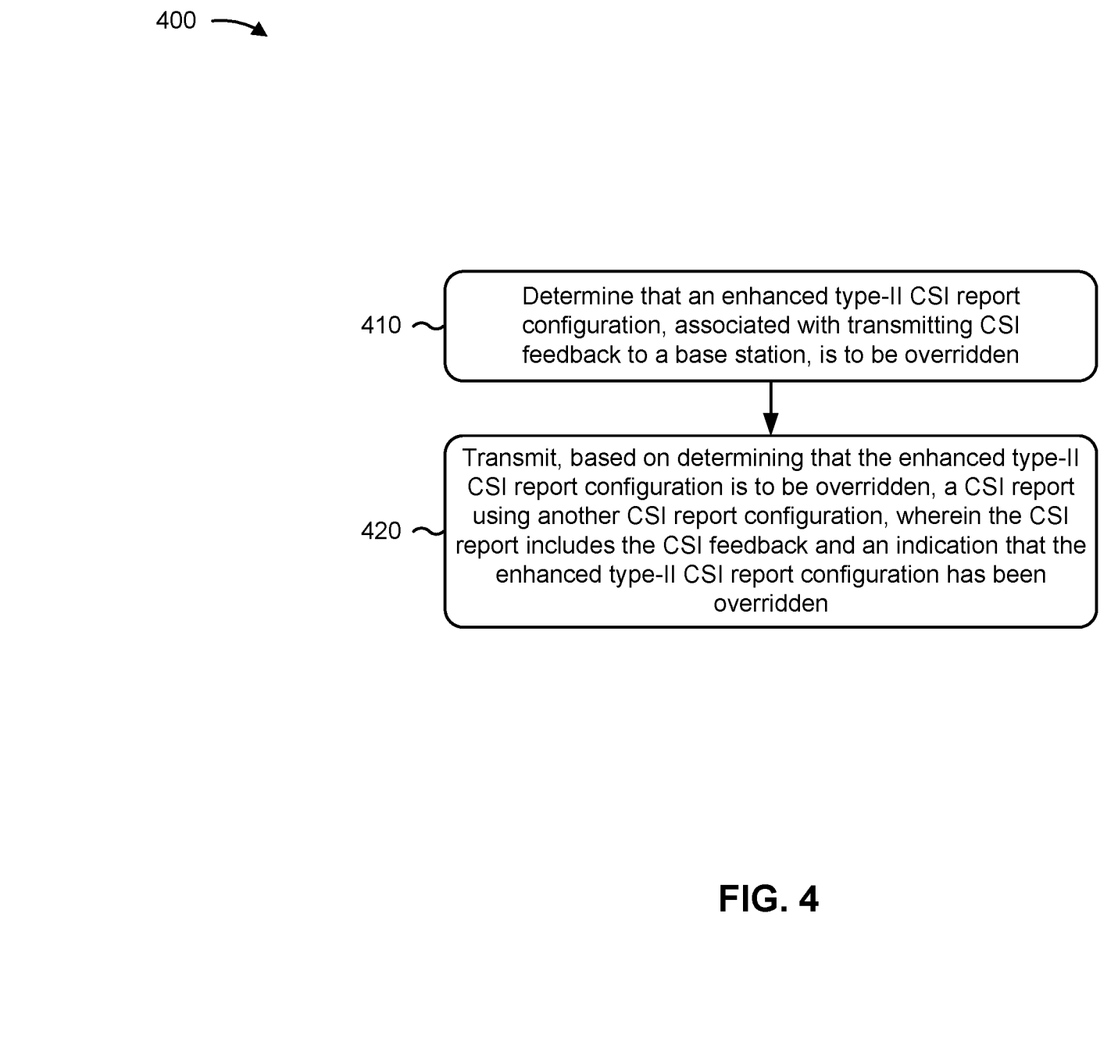
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120) performs override for enhanced type-II CSI.

As shown in FIG. 4, in some aspects, process 400 may include determining that an enhanced type-II CSI report configuration, associated with transmitting CSI feedback to a base station, is to be overridden (block 410). For example, the UE may determine (e.g., using antenna 252, DEMOD 254, MIMO detector 256, receive processor 258, transmit processor 264, controller/processor 280, and/or the like) that an enhanced type-II CSI report configuration, associated with transmitting CSI feedback to a base station, is to be overridden, as described above.

As shown in FIG. 4, in some aspects, process 400 may include transmitting, based at least in part on determining that the enhanced type-II CSI report configuration is to be overridden, a CSI report using another CSI report configuration (block 420). For example, the UE may transmit (e.g., using antenna 252, MOD 254, TX MIMO processor 266, transmit processor 264, controller/processor 280, and/or the like), based at least in part on determining that the enhanced type-II CSI report configuration is to be overridden, a CSI report using another CSI report configuration, as described above. In some aspects, the CSI report includes the CSI feedback and an indication that the enhanced type-II CSI report configuration has been overridden.

Process 400 may include additional aspects, such as any single aspect and/or any combination of aspects described below and/or in connection with one or more other processes described elsewhere herein.

In a first aspect, the determination that the enhanced type-II CSI report configuration is to be overridden is made based at least in part on determining that a metric, associated with the enhanced type-II CSI report configuration, is inferior to a metric associated with a type-I CSI report configuration.

In a second aspect, alone or in combination with the first aspect, the metric associated with the enhanced type-II CSI report configuration and the metric associated with the type-I CSI report configuration include at least one of: a signal to noise ratio (SNR); a capacity metric; or a channel quality indicator (CQI).

In a third aspect, alone or in combination with any one or more of the first and second aspects, the determination that the enhanced type-II CSI report configuration is to be overridden is made based at least in part on determining that a difference between a metric, associated with the enhanced type-II CSI report configuration, and a metric associated with a type-II CSI report configuration, satisfies a threshold.

In a fourth aspect, alone or in combination with any one or more of the first through third aspects, the metric associated with the enhanced type-II CSI report configuration and the metric associated with the type-II CSI report configuration include at least one of: a signal to noise ratio (SNR); a capacity metric; or a channel quality indicator (CQI).

In a fifth aspect, alone or in combination with any one or more of the first through fourth aspects, the threshold is predefined on the UE.

In a sixth aspect, alone or in combination with any one or more of the first through fifth aspects, the threshold is configured on the UE by the base station.

In a seventh aspect, alone or in combination with any one or more of the first through sixth aspects, the determination that the enhanced type-II CSI report configuration is to be overridden is made based at least in part on an override condition configured on or determined by the UE.

In an eighth aspect, alone or in combination with any one or more of the first through seventh aspects, the indication that the enhanced type-II CSI report configuration has been overridden is included in the CSI report using a combination of unused or invalid values associated with at least one of: a rank indicator (RI); a precoding matrix indicator (PMI); or a channel quality indicator (CQI).

In a ninth aspect, alone or in combination with any one or more of the first through eighth aspects, the indication that the enhanced type-II CSI report configuration has been overridden is an out of range (OOR) channel quality indicator (CQI) included the CSI report.

In a tenth aspect, alone or in combination with any one or more of the first through ninth aspects, the indication that the enhanced type-II CSI report configuration has been overridden is a dedicated precoding matrix indicator (PMI) included in the CSI report.

In an eleventh aspect, alone or in combination with any one or more of the first through tenth aspects, the dedicated PMI identifies a number of frequency domain (FD) basis vectors as zero or a number of coefficients as zero.

In a twelfth aspect, alone or in combination with any one or more of the first through eleventh aspects, the dedicated PMI identifies amplitudes of all coefficients as zero.

In a thirteenth aspect, alone or in combination with any one or more of the first through twelfth aspects, the indication that the enhanced type-II CSI report configuration has been overridden is included in the CSI report using an addition to the CSI report.

In a fourteenth aspect, alone or in combination with any one or more of the first through thirteenth aspects, the addition includes one or more bits in the CSI report.

In a fifteenth aspect, alone or in combination with any one or more of the first through fourteenth aspects, the indication that the enhanced type-II CSI report configuration has been overridden is included in part I of the CSI report.

In a sixteenth aspect, alone or in combination with any one or more of the first through fifteenth aspects, the indication that the enhanced type-II CSI report configuration has been overridden is included in part II of the CSI report.

In a seventeenth aspect, alone or in combination with any one or more of the first through sixteenth aspects, the enhanced type-II CSI report configuration is associated with a first codebook configured on the UE, and the other CSI report configuration is associated with a second codebook configured on the UE.

In an eighteenth aspect, alone or in combination with any one or more of the first through seventeenth aspects, the other CSI report configuration is a type-II CSI report configuration associated with the second codebook.

In a nineteenth aspect, alone or in combination with any one or more of the first through eighteenth aspects, the other CSI report configuration is a type-I CSI report configuration associated with the second codebook.

In a twentieth aspect, alone or in combination with any one or more of the first through nineteenth aspects, the other CSI report configuration is a simplified enhanced type-II CSI report configuration.

In a twenty-first aspect, alone or in combination with any one or more of the first through twentieth aspects, the other CSI report configuration is a modified type-II CSI report configuration.

In a twenty-second aspect, alone or in combination with any one or more of the first through twenty-first aspects, one or more parameters, associated with the other CSI report configuration, are overridden in the CSI report.

In a twenty-third aspect, alone or in combination with any one or more of the first through twenty-second aspects, based at least in part on the other CSI report configuration, the CSI report includes information associated with a single coefficient and information associated with a single basis.

In a twenty-fourth, alone or in combination with any one or more of the first through twenty-third aspects, the information associated with the single coefficient includes information that identifies the single coefficient.

In a twenty-fifth aspect, alone or in combination with any one or more of the first through twenty-fourth aspects, the information associated with the single coefficient includes information that identifies a location of a strongest coefficient.

In a twenty-sixth aspect, alone or in combination with any one or more of the first through twenty-fifth aspects, based at least in part on the other CSI report configuration, the CSI report includes only a spatial domain compression matrix (W1).

In a twenty-seventh aspect, alone or in combination with any one or more of the first through twenty-sixth aspects, based at least in part on the other CSI report configuration, the CSI report does not include part II. In a twenty-eighth aspect, alone or in combination with any one or more of the first through twenty-seventh aspects, the indication that the enhanced type-II CSI report configuration has been overridden is an indication that an identity matrix has been selected as a frequency domain basis, where the other CSI report configuration is an enhanced type-II CSI report configuration using the identity matrix as the frequency domain basis.

In a twenty-ninth aspect, alone or in combination with any one or more of the first through twenty-eighth aspects, the use of the identity matrix results in per subband level reporting in the CSI report.

In a thirtieth aspect, alone or in combination with any one or more of the first through twenty-ninth aspects, the identity matrix is used based at least in part on determining that a metric, associated with using a DFT matrix as the frequency basis, is inferior to a metric associated with using the identity matrix as the frequency basis.

In a thirty-first aspect, alone or in combination with any one or more of the first through thirtieth aspects, the metric associated with using the DFT matrix as the frequency basis and the metric associated with using the identity matrix include at least one of: a SNR; a capacity metric; or a CQI.

In a thirty-second aspect, alone or in combination with any one or more of the first through thirty-first aspects, the identity matrix is used based at least in part on determining that a difference between a metric associated with using a DFT matrix as the frequency basis, and a metric associated with using the identity matrix as the frequency basis, satisfies a threshold.

In a thirty-third aspect, alone or in combination with any one or more of the first through thirty-second aspects the metric associated with using the DFT matrix as the frequency basis and the metric associated with using the identity matrix include at least one of: a SNR; a capacity metric; or a CQI.

In a thirty-fourth aspect, alone or in combination with any one or more of the first through thirty-third aspects the threshold is predefined on the UE.

In a thirty-fifth aspect, alone or in combination with any one or more of the first through thirty-fourth aspects the threshold is configured on the UE by the base station.

In a thirty-sixth aspect, alone or in combination with any one or more of the first through thirty-fifth aspects the determination that the identity matrix is to be used is made based at least in part on a selection condition configured on or determined by the UE.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
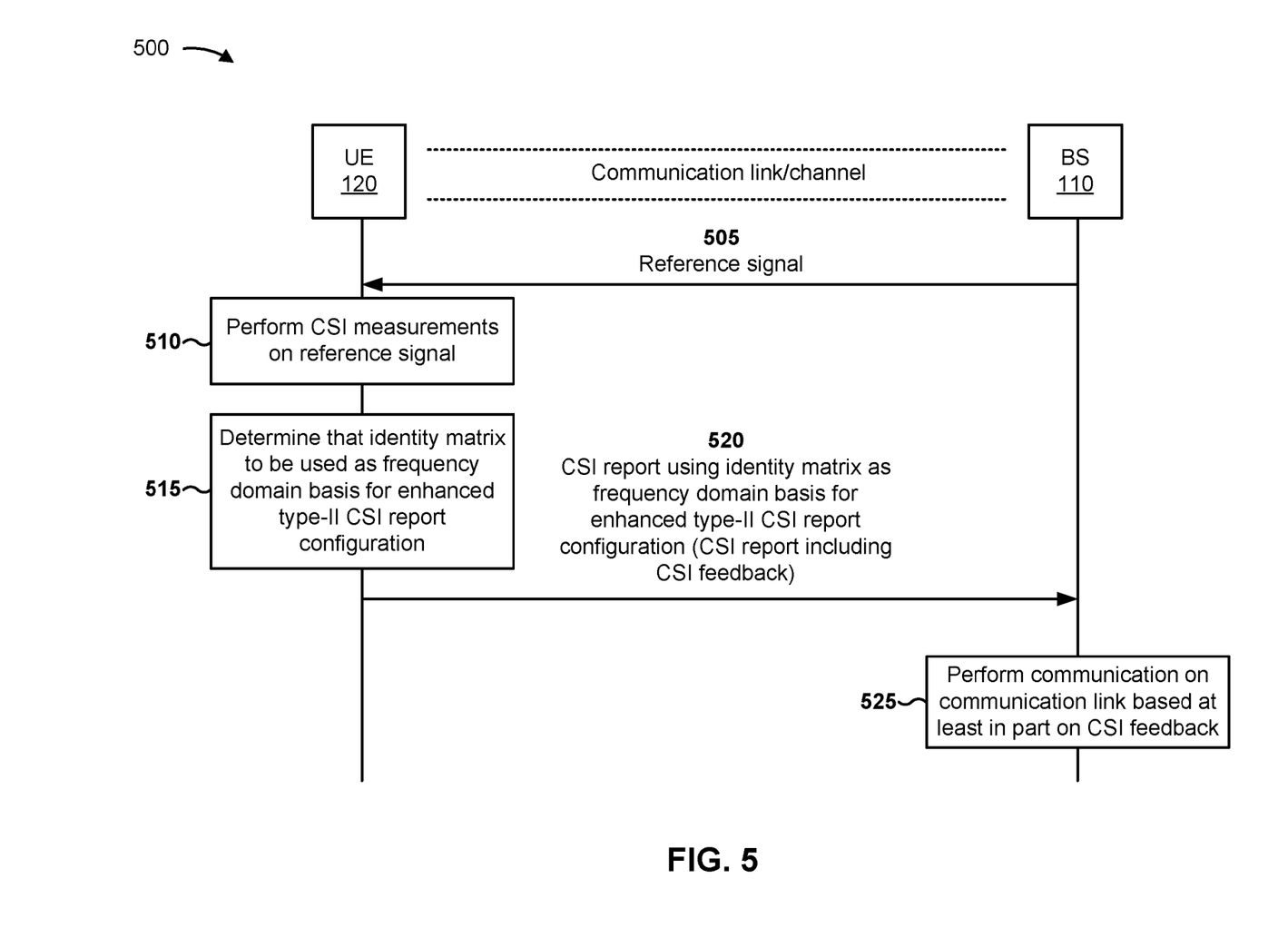
FIG. 5 is a diagram illustrating an example of user equipment improvement for enhanced type-II channel state information, in accordance with various aspects of the present disclosure.

FIG. 5 is a diagram illustrating an example 500 of UE override for enhanced type-II CSI, in accordance with various aspects of the present disclosure. As shown, example 500 includes a UE 120 and a BS 110 that are associated with a communication link. As further shown, the communication link may be associated with a channel. For example, the communication link may be referred to as the channel, or may propagate via the channel.

As shown in FIG. 5, and by reference number 505, BS 110 may transmit a reference signal transmission to UE 120. The reference signal transmission may include, for example, a CSI reference signal, a demodulation reference signal, and/ or the like. As shown by reference number 510, UE 120 may perform CSI measurements on the reference signal transmission. For example, UE 120 may perform channel estimation or another operation based at least in part on the reference signal transmissions in order to determine CSI feedback.

As shown by reference number 515, UE 120 may determine that an identity matrix is to be used as a frequency domain basis for an enhanced type-II CSI report configuration associated with transmitting CSI feedback to BS 110. For example, UE 120 may be configured with a codebook indicating that UE 120 is to use the enhanced type-II CSI report configuration in association with transmitting a CSI report to BS 110. However, as indicated by reference number 515, UE 120 may determine that UE 120 is to use an identity matrix as a frequency basis for the enhanced type-II CSI report configuration, in some aspects.

In some aspects, UE 120 may determine that UE 120 is to use the identity matrix as the frequency basis for the enhanced type-II CSI report configuration based at least in part on determining that a metric, associated with using a DFT matrix as the frequency basis for the enhanced type-II CSI report configuration, is inferior to a metric associated with using the identity matrix as the frequency basis for the enhanced type-II CSI report configuration. For example, based at least in part on the CSI measurements performed by UE 120, UE 120 may compute a metric for the enhanced type-II CSI report configuration using the identity matrix as the frequency basis and a comparable metric for the enhanced type-II CSI report configuration using the DFT matrix as the frequency basis. In this example, if the metric associated with using the DFT matrix is inferior to (e.g., less than, by a threshold amount) the metric associated with the identity matrix, then UE 120 may determine that UE 120 is to use the identity matrix as the frequency basis for the enhanced type-II CSI report configuration. In some aspects, the metric used by UE 120 to make this determination may include a signal to noise ratio (SNR), a capacity metric, a channel quality indicator (CQI), and/or the like.

In some aspects, UE 120 may determine that UE 120 is to use the identity matrix as the frequency basis for the enhanced type-II CSI report configuration based at least in part on determining that a difference between a metric associated with using a DFT matrix as the frequency basis for the enhanced type-II CSI report configuration, and a metric associated with using the identity matrix as the frequency basis for the enhanced type-II CSI report configuration, satisfies a threshold. For example, based at least in part on the CSI measurements performed by UE 120, UE 120 may compute a metric for the enhanced type-II CSI report configuration using the identity matrix as the frequency basis and a comparable metric for the enhanced type-II CSI report configuration using the DFT matrix as the frequency basis. In this example, if a difference between the metric associated using the DFT matrix and the metric associated with using the identity matrix satisfies a threshold, then UE 120 may determine that UE 120 is to use the identity matrix as the frequency basis for the enhanced type-II CSI report configuration. In some aspects, the metric used by UE 120 to make this determination may include, for example, an SNR, a capacity metric, a CQI, and/or the like. In some aspects, the threshold may be predefined on UE 120 (e.g., in accordance with an applicable 3GPP standard), or may be configured on UE 120 (e.g., by BS 110).

In some aspects, UE 120 may determine that UE 120 is to use the identity matrix as the frequency basis for the enhanced type-II CSI report configuration based at least in part on a condition configured on or determined by UE 120. The condition may include, for example, a determination by UE 120 that a configured parameter (e.g., a configured number of FD basis vectors, a configured number of coefficients, and/or the like) fails to satisfy a threshold (e.g., is less than a particular number) and/or is otherwise determined to be insufficient to a particular degree.

As shown by reference number 520, UE 120 may transmit a CSI report using the identity matrix as the frequency domain basis for the enhanced type-II CSI report configuration. In some aspects, the use of the identity matrix results in per subband level reporting in the CSI report (e.g., rather than a frequency domain compressed version of CSI reporting). In some aspects, UE 120 may transmit the CSI report in a manner similar to that described above in association with FIG. 3.

As shown by reference number 525, BS 110 (and/or UE 120) may perform communication on the communication link based at least in part on the CSI feedback. For example, BS 110 may generate one or more beamformed beams for UE 120 using phase and amplitude FD coefficients, one or more spatial domain basis vectors, one or more frequency domain basis vectors, and/or other information included in the CSI feedback.

In this way, UE 120 may use an improved enhanced type-II CSI report configuration in order to improve accuracy in reporting of CSI feedback (e.g., in a case when the conventional enhanced type-II CSI report configuration is insufficient), thereby improving communication performance between UE 120 and BS 110.

As indicated above, FIG. 5 is provided as an example. Other examples may differ from what is described with respect to FIG. 5.

Figure 6:
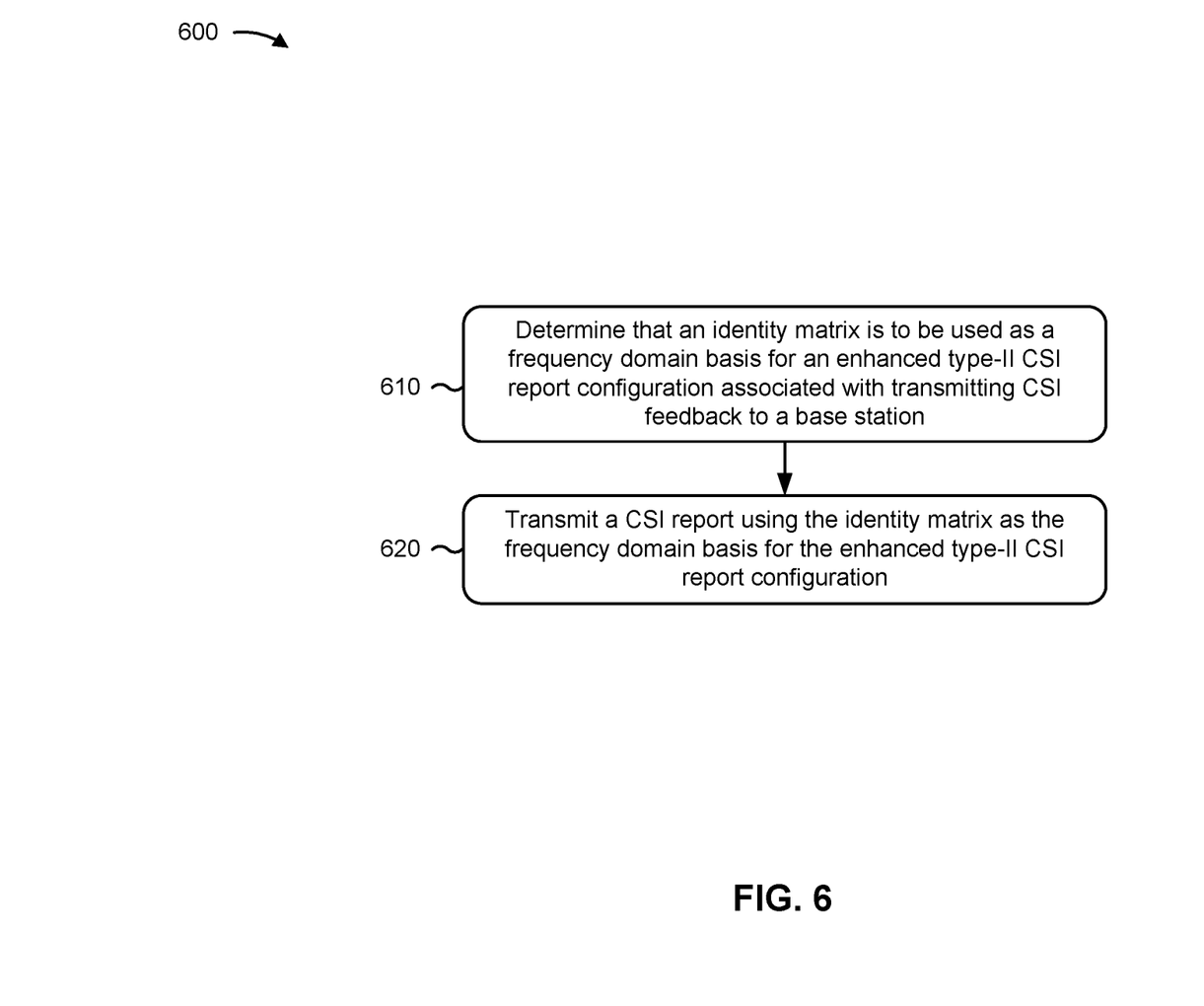
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) performs improvement of enhanced type-II CSI.

As shown in FIG. 6, in some aspects, process 600 may include determining that an identity matrix is to be used as a frequency domain basis for an enhanced type-II CSI report configuration associated with transmitting CSI feedback to a base station (block 610). For example, the UE may determine (e.g., using antenna 252, DEMOD 256, MIMO detector 256, receive processor 258, transmit processor 266, controller/processor 280, and/or the like) that an identity matrix is to be used as a frequency domain basis for an enhanced type-II CSI report configuration associated with transmitting CSI feedback to a base station, as described above.

As shown in FIG. 6, in some aspects, process 600 may include transmitting a CSI report using the identity matrix as the frequency domain basis for the enhanced type-II CSI report configuration (block 620). For example, the UE may transmit (e.g., using antenna 252, MOD 256, TX MIMO processor 266, transmit processor 266, controller/processor 280, and/or the like) a CSI report using the identity matrix as the frequency domain basis for the enhanced type-II CSI report configuration, as described above.

Process 600 may include additional aspects, such as any single aspect and/or any combination of aspects described herein and/or in connection with one or more other processes described elsewhere herein.

In a first aspect, the use of the identity matrix results in per subband level reporting in the CSI report.

In a second aspect, alone or in combination with any one or more of the first and second aspects, the determination that the identity matrix is to be used is made based at least in part on determining that a metric, associated with using a DFT matrix as the frequency basis, is inferior to a metric associated with using the identity matrix as the frequency basis.

In a third aspect, alone or in combination with any one or more of the first and second aspects, the metric associated with using the DFT matrix as the frequency basis and the metric associated with using the identity matrix include at least one of: a SNR; a capacity metric; or a CQI.

In a fourth aspect, alone or in combination with any one or more of the first through third aspects, the determination that the identity matrix is to be used is made based at least in part on determining that a difference between a metric associated with using a DFT matrix as the frequency basis, and a metric associated with using the identity matrix as the frequency basis, satisfies a threshold.

In a fifth aspect, alone or in combination with any one or more of the first through fourth aspects, the metric associated with using the DFT matrix as the frequency basis and the metric associated with using the identity matrix include at least one of: a SNR; a capacity metric; or a CQI.

In a sixth aspect, alone or in combination with any one or more of the first through fifth aspects, the threshold is predefined on the UE.

In a seventh aspect, alone or in combination with any one or more of the first through sixth aspects, the threshold is configured on the UE by the base station.

In an eighth aspect, alone or in combination with any one or more of the first through seventh aspects, the determination that the identity matrix is to be used is made based at least in part on a selection condition configured on or determined by the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining that an enhanced type-II channel state information (CSI) report configuration, associated with transmitting CSI feedback to a base station, is to be overridden; and
    transmitting, based at least in part on determining that the enhanced type-II CSI report configuration is to be overridden, a CSI report using another CSI report configuration,
        wherein the CSI report includes the CSI feedback and an indication that the enhanced type-II CSI report configuration has been overridden.

2. The method of claim 1, wherein the determination that the enhanced type-II CSI report configuration is to be overridden is made based at least in part on determining that a metric, associated with the enhanced type-II CSI report configuration, is inferior to a metric associated with a type-I CSI report configuration.

3. The method of claim 2, wherein the metric associated with the enhanced type-II CSI report configuration and the metric associated with the type-I CSI report configuration include at least one of:
    a signal to noise ratio (SNR);
    a capacity metric; or
    a channel quality indicator (CQI).

4. The method of claim 1, wherein the determination that the enhanced type-II CSI report configuration is to be overridden is made based at least in part on determining that a difference between a metric associated with the enhanced type-II CSI report configuration, and a metric associated with a type-II CSI report configuration, satisfies a threshold.

5. The method of claim 4, wherein the metric associated with the enhanced type-II CSI report configuration and the metric associated with the type-II CSI report configuration include at least one of:
    a signal to noise ratio (SNR);
    a capacity metric; or
    a channel quality indicator (CQI).

6. The method of claim 5, wherein the threshold is predefined on the UE or is configured on the UE by the base station.

7. The method of claim 1, wherein the determination that the enhanced type-II CSI report configuration is to be overridden is made based at least in part on an override condition configured on or determined by the UE.

8. The method of claim 1, wherein the indication that the enhanced type-II CSI report configuration has been overridden is included in the CSI report using a combination of unused or invalid values associated with at least one of:
    a rank indicator (RI);
    a precoding matrix indicator (PMI); or
    a channel quality indicator (CQI).

9. The method of claim 1, wherein the indication that the enhanced type-II CSI report configuration has been overridden is an out of range (OOR) channel quality indicator (CQI) included the CSI report.

10. The method of claim 1, wherein the indication that the enhanced type-II CSI report configuration has been overridden is a dedicated precoding matrix indicator (PMI) included in the CSI report.

11. The method of claim 10, wherein the dedicated PMI identifies at least one of:
    a number of frequency domain (FD) basis vectors as zero or a number of coefficients as zero, or
    amplitudes of all coefficients as zero.

12. The method of claim 1, wherein the indication that the enhanced type-II CSI report configuration has been overridden is included in the CSI report using an addition to the CSI report.

13. The method of claim 1, wherein the indication that the enhanced type-II CSI report configuration has been overridden is included in part I of the CSI report.

14. The method of claim 1, wherein the indication that the enhanced type-II CSI report configuration has been overridden is included in part II of the CSI report.

15. The method of claim 1, wherein the enhanced type-II CSI report configuration is associated with a first codebook configured on the UE, and
wherein the other CSI report configuration is associated with a second codebook configured on the UE.

16. The method of claim 15, wherein the other CSI report configuration is at least one of:
a type-II CSI report configuration associated with the second codebook, or
a type-I CSI report configuration associated with the second codebook.

17. The method of claim 1, wherein the other CSI report configuration is a simplified enhanced type-II CSI report configuration.

18. The method of claim 1, wherein the other CSI report configuration is a modified type-II CSI report configuration.

19. The method of claim 1, wherein one or more parameters, associated with the other CSI report configuration, are overridden in the CSI report.

20. The method of claim 1, wherein, based at least in part on the other CSI report configuration, the CSI report includes information associated with a single coefficient and information associated with a single basis.

21. The method of claim 20, wherein the information associated with the single coefficient includes information that identifies at least one of:
the single coefficient, or
a location of a strongest coefficient.

22. The method of claim 1, wherein, based at least in part on the other CSI report configuration, the CSI report includes only a spatial domain compression matrix (W1).

23. The method of claim 1, wherein, based at least in part on the other CSI report configuration, the CSI report does not include a part II.

24. The method of claim 1, wherein the indication that the enhanced type-II CSI report configuration has been overridden is an indication that an identity matrix has been selected as a frequency domain basis,
wherein the other CSI report configuration is an enhanced type-II CSI report configuration using the identity matrix as the frequency domain basis.

25. The method of claim 24, wherein the use of the identity matrix results in per subband level reporting in the CSI report.

26. The method of claim 24, wherein the identity matrix is used based at least in part on determining that a metric, associated with using a discrete Fourier transform (DFT) matrix as the frequency basis, is inferior to a metric associated with using the identity matrix as the frequency basis.

27. The method of claim 24, wherein the identity matrix is used based at least in part on determining that a difference between a metric associated with using a discrete Fourier transform (DFT) matrix as the frequency basis, and a metric associated with using the identity matrix as the frequency basis, satisfies a threshold.

28. A user equipment (UE) for wireless communication, comprising:
a memory; and
one or more processors operatively coupled to the memory, the memory and the one or more processors configured to:
determine that an enhanced type-II channel state information (CSI) report configuration, associated with transmitting CSI feedback to a base station, is to be overridden; and
transmit, based at least in part on determining that the enhanced type-II CSI report configuration is to be overridden, a CSI report using another CSI report configuration,
wherein the CSI report includes the CSI feedback and an indication that the enhanced type-II CSI report configuration has been overridden.

29. A non-transitory computer-readable medium storing one or more instructions for wireless communication, the one or more instructions comprising:
one or more instructions that, when executed by one or more processors of a user equipment (UE), cause the one or more processors to:
determine that an enhanced type-II channel state information (CSI) report configuration, associated with transmitting CSI feedback to a base station, is to be overridden; and
transmit, based at least in part on determining that the enhanced type-II CSI report configuration is to be overridden, a CSI report using another CSI report configuration,
wherein the CSI report includes the CSI feedback and an indication that the enhanced type-II CSI report configuration has been overridden.

30. An apparatus for wireless communication, comprising:
means for determining that an enhanced type-II channel state information (CSI) report configuration, associated with transmitting CSI feedback to a base station, is to be overridden; and
means for transmitting, based at least in part on determining that the enhanced type-II CSI report configuration is to be overridden, a CSI report using another CSI report configuration,
wherein the CSI report includes the CSI feedback and an indication that the enhanced type-II CSI report configuration has been overridden.

* * * * *